United States Patent
Borowski et al.

(10) Patent No.: US 7,327,717 B2
(45) Date of Patent: Feb. 5, 2008

(54) WIRELESS LAN RECEIVER SYNCHRONIZATION

(75) Inventors: Jörg Borowski, Dresden (DE); Uwe Eckhardt, Dresden (DE); Michael Schmidt, Dresden (DE); Frank Poegel, Dresden (DE); Menno Mennenga, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1055 days.

(21) Appl. No.: 10/185,354

(22) Filed: Jun. 27, 2002

(65) Prior Publication Data

US 2003/0169711 A1 Sep. 11, 2003

(30) Foreign Application Priority Data

Mar. 8, 2002 (DE) ................... 102 10 236

(51) Int. Cl.
*H04Q 7/24* (2006.01)
*H04B 1/00* (2006.01)
*H04J 3/06* (2006.01)

(52) U.S. Cl. ............... 370/350; 370/338; 370/503; 375/137; 375/134

(58) Field of Classification Search ........... 370/503, 370/330, 350, 342, 510, 511, 512, 513, 514, 370/515, 516, 517; 375/136, 137, 147, 150
See application file for complete search history.

(56) References Cited

U.S. PATENT DOCUMENTS 5,608,722 A * 3/1997 Miller ................. 370/320
6,157,820 A * 12/2000 Sourour et al. .......... 455/226.2
6,263,009 B1 7/2001 Ramberg et al.
6,650,692 B2 * 11/2003 Inoue et al. ............... 375/147
6,862,324 B1 * 3/2005 Lui et al. ................... 375/326
6,868,113 B2 * 3/2005 Yamashita ................ 375/147
6,917,657 B2 * 7/2005 McCarty, Jr. ............. 375/355
7,010,016 B2 * 3/2006 Margulis et al. ........... 375/147
7,016,335 B1 * 3/2006 Enssle et al. .............. 370/342
7,106,709 B2 * 9/2006 Davidsson et al. ......... 370/330
2002/0016949 A1 2/2002 Goslin et al.
2002/0025012 A1 2/2002 Saito et al.

FOREIGN PATENT DOCUMENTS

EP 886 385 12/1998
WO 01/91331 11/2001

* cited by examiner

*Primary Examiner*—Hanh Nguyen
(74) *Attorney, Agent, or Firm*—Meyertons Hood Kivlin Kowert & Goetzel, P.C.; B. Noël Kivlin (57) ABSTRACT

A WLAN (Wireless Local Area Network) receiver is provided that provides at least two acquisition units and at least two tracking units. The acquisition units perform a synchronization acquisition process, and the tracking units perform a synchronization tracking process. The acquisition units are arranged for being operated sequentially while the tracking units are arranged for being operated simultaneously. In an embodiment, frequency and phase error correction may be performed separately, and those units that operate at higher sampling rates may be located before lower-rate units. The synchronization process may include data-aided as well as non data-aided algorithms.

86 Claims, 6 Drawing Sheets

WIRELESS LAN RECEIVER SYNCHRONIZATION

BACKGROUND OF THE INVENTION

1. Field of the Invention

The invention generally relates to WLAN (Wireless Local Area Network) receivers, and in particular to synchronization processes in such WLAN receivers.

2. Description of the Related Art

A wireless local area network is a flexible data communications system implemented as an extension to or as an alternative for, a wired LAN. Using radio frequency or infrared technology, WLAN systems transmit and receive data over the air, minimizing the need for wired connections. Thus, WLAN systems combine data connectivity with user mobility.

Today, most WLAN systems use spread spectrum technology, a wide-band radio frequency technique developed for use in reliable and secure communication systems. The spread spectrum technology is designed to trade-off bandwidth efficiency for reliability, integrity and security. Two types of spread spectrum radio systems are frequently used: frequency hopping and direct sequence systems.

The standard defining and governing wireless local area networks that operate in the 2.4 GHz spectrum, is the IEEE 802.11 standard. To allow higher data rate transmissions, the standard was extended to 802.11b that allows data rates of 5.5 and 11 Mbps in the 2.4 GHz spectrum. This extension is backwards compatible.

When operating a WLAN receiver, code synchronization is necessary because the code is the key to despreading the desired information. A good synchronization is achieved when the coded signal arriving at the receiver is accurately timed in both its code pattern position and its rate of chip generation.

Figure 1:
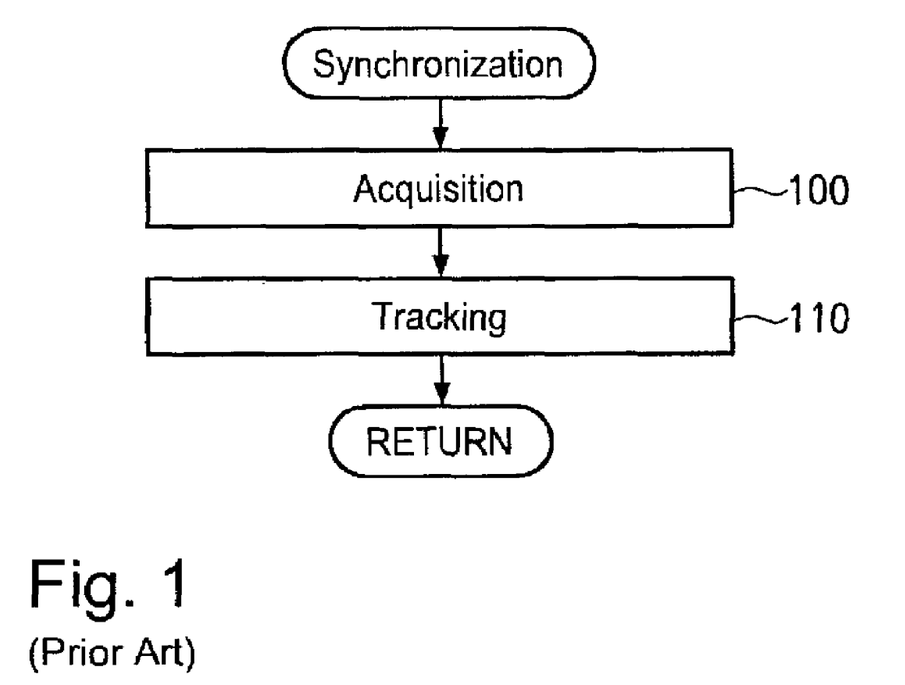
FIG. 1 is a flowchart illustrating the phases which can be distinguished in a synchronization process of a WLAN receiver.

Referring now to FIG. 1, the synchronization process performed in the WLAN receiver can be divided into two phases. First, a synchronization acquisition is performed in step 100 to initially synchronize the receiver with a received signal. The second part of the synchronization follows the initial acquisition since the receiver must continue to operate in such a way that it remains locked with its code reference. That is, the receiver exactly tracks in step 110 the coded incoming signal to cause its own code chip rate to match the incoming code chip rate as precisely as possible.

With respect to the synchronization algorithms used, receivers may be classified into data-aided and non data-aided receivers. The data-aided approach does not require a prior knowledge of the interference parameters but requires a training data sequence. Non data-aided (or blind) algorithms require no training data sequence but only knowledge of the desired user signal sequence and its timing.

Synchronization circuits in existing WLAN receivers still have a number of problems. One problem is that conventional circuits may be unstable in operation and sometimes work unreliably. Further, the circuits often are highly involved and therefore lead to high circuit development and manufacturing costs. Another disadvantage of existing synchronization circuits is that the phase adjustment process may be performed with insufficient digital resolution. Moreover, instability situations may occur in synchronization loops when performing the synchronization acquisition.

SUMMARY OF THE INVENTION

An improved WLAN receiver and operation method are provided that may allow for synchronization and mobile radio fading channel compensation particularly in high rate WLAN systems.

In one embodiment, a WLAN receiver is provided that comprises at least two acquisition units for performing a synchronization acquisition process and at least two tracking units for performing a synchronization tracking process. The at least two acquisition units are arranged for being operated sequentially and the at least two tracking units are arranged for being operated simultaneously.

In another embodiment, there may be provided a method of operating a WLAN receiver. The method comprises performing a synchronization acquisition and performing a synchronization tracking. The synchronization acquisition includes performing at least two acquisition processes sequentially, and the synchronization tracking includes performing at least two tracking processes simultaneously.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings.

Figure 2:
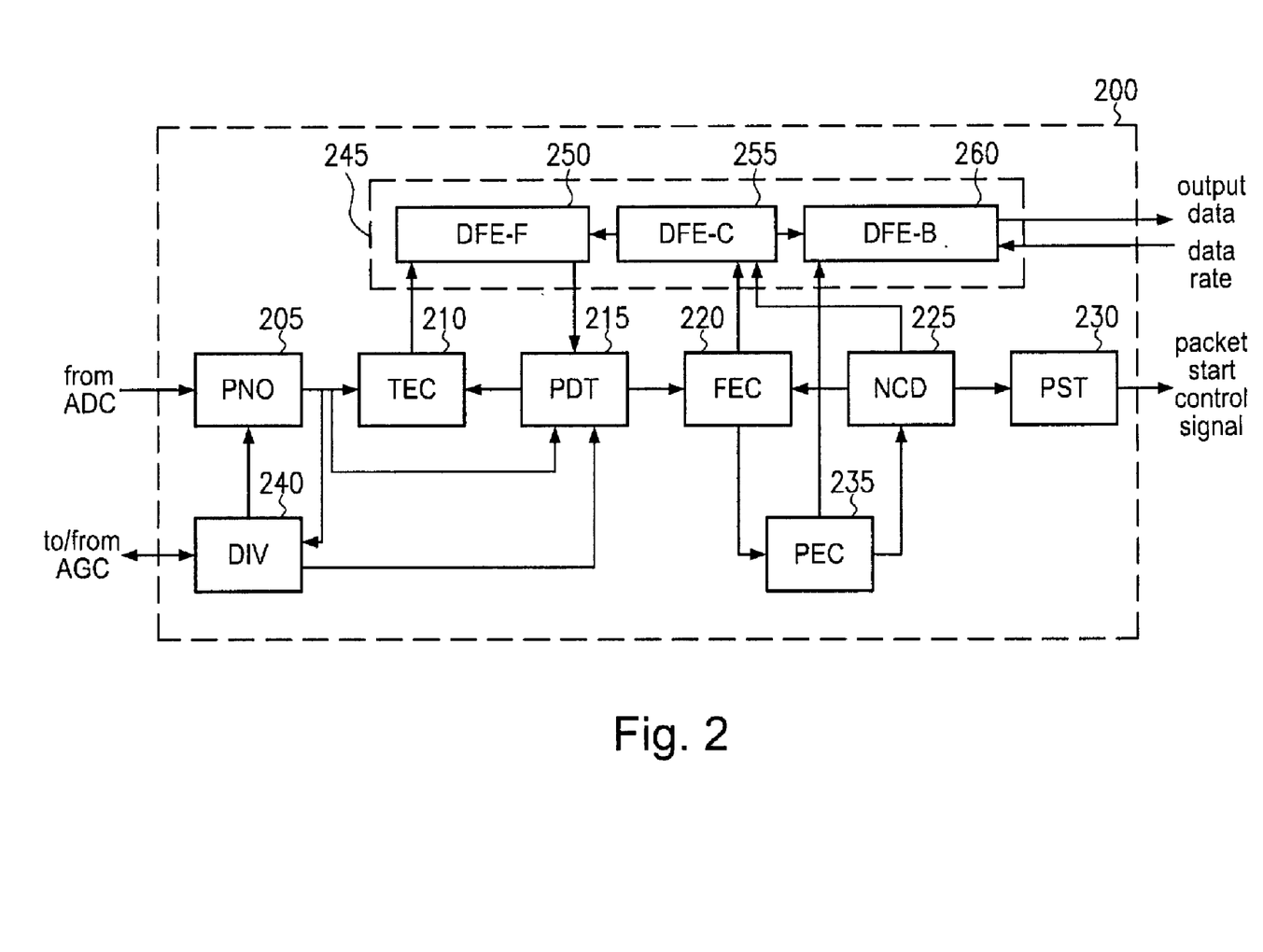
FIG. 2 is a block diagram illustrating the components of a WLAN receiver according to an embodiment.

Referring now to the drawings and particular to FIG. 2 which illustrates the components of a WLAN receiver according to an embodiment, the receiver has a radio-frequency part and a baseband part 200 that is connected to the radio-frequency part. The radio-frequency part is an analog circuit that receives an analog signal and provides a digitized representation thereof to the baseband part 200. For this purpose, the radio-frequency part comprises an analog-to-digital converter (ADC).

Moreover, the radio-frequency part performs an automatic gain control (AGC) to control the amplification gain dependent on the received signal power or strength. The AGC unit is located in the analog radio-frequency part and interchanges control signals with the digital circuitry of the baseband part 200.

The baseband part 200 of the WLAN receiver of the present embodiment shown in FIG. 2 has a number of units that are interconnected to form a data path. That is, the baseband part 200 receives the digitized input signal from the radio-frequency part and generates output data that is to be filtered, demodulated, decoded and descrambled for further processing.

When receiving the digitized input signal in the baseband part 200, a power normalization (PNO) is performed in unit 205 to normalize the power of the input signal. The power normalization may be performed under control of a diversity selection (DIV) unit 240 that controls antenna diversity and which is connected to the automatic gain controller of the radio-frequency part. For performing the diversity selection, unit 240 receives the normalized signal from unit 205.

The diversity selection unit 240 may further provide a control signal to preamble detection (PDT) unit 215. The preamble detection unit 215 receives the normalized signal from unit 205 and detects a preamble in this signal. A preamble is a special signal pattern used for synchronization acquisition.

As may be seen from FIG. 2, the preamble detection unit 215 provides output signals to a timing error correction (TEC) unit 210 and a frequency error correction (FEC) unit 220. These units are used to detect and correct timing errors and frequency errors, respectively.

As mentioned above, the preamble detection unit 215 receives the normalized input signal from power normalization unit 205. In addition, it receives input from the feed-forward filter (DFE-F) 250 of a decision feedback equalizer 245. The feedforward filter 250 receives the output signal of the timing error correction unit 210 and filters this signal under control of decision feedback equalization controller (DFE-C) 255. The filtered signal is fed to the preamble detection unit 215.

As can further be seen from FIG. 2, the decision feedback equalization controller 255 may operate dependent on certain input signals that are received from the frequency error correction unit 220 and/or the non-coherent detection (NCD) unit 225. The non-coherent detection unit 225 filters and demodulates a signal that is received from the phase error correction (PEC) unit 235 to obtain a demodulated binary reference sequence. This binary reference sequence is fed into the decision feedback equalization controller 255 for joint processing with the data signal coming from frequency error correction unit 220.

The phase error correction unit 235 that provides a signal to the non-coherent detection unit 225 receives an output signal from the frequency error correction unit 220. That is, the frequency control and the phase control is done in two separate stages, and the phase error correction is performed based on a signal that has previously been corrected with respect to a frequency error.

As apparent from the figure, the phase error correction unit 235 further provides an input signal to the feedback filter 260 of the decision feedback equalizer 245. The feedback filter 260 filters this data to provide output data, and it is controlled by the decision feedback equalization controller 255. Further, the feedback filter 260 may receive a signal which is indicative of the data rate.

Moreover, there is provided a packet start detection (PST) unit 230 that detects the start of frame delimiter (SFD) portion in the received data signal to generate a packet start control signal. For this purpose, the packet start detection unit 230 receives input from the non-coherent detection unit 225.

As apparent from the foregoing description of the present embodiment, the receiver comprises a number of units that form a data path. Each unit is for performing a given function in the synchronization (acquisition and tracking) process. As each function of the individual units is required in only a given period of time, the units are activated in the present embodiment in a predetermined sequence. Once the function of a given unit is no longer required, the unit may be deactivated.

Figure 3:
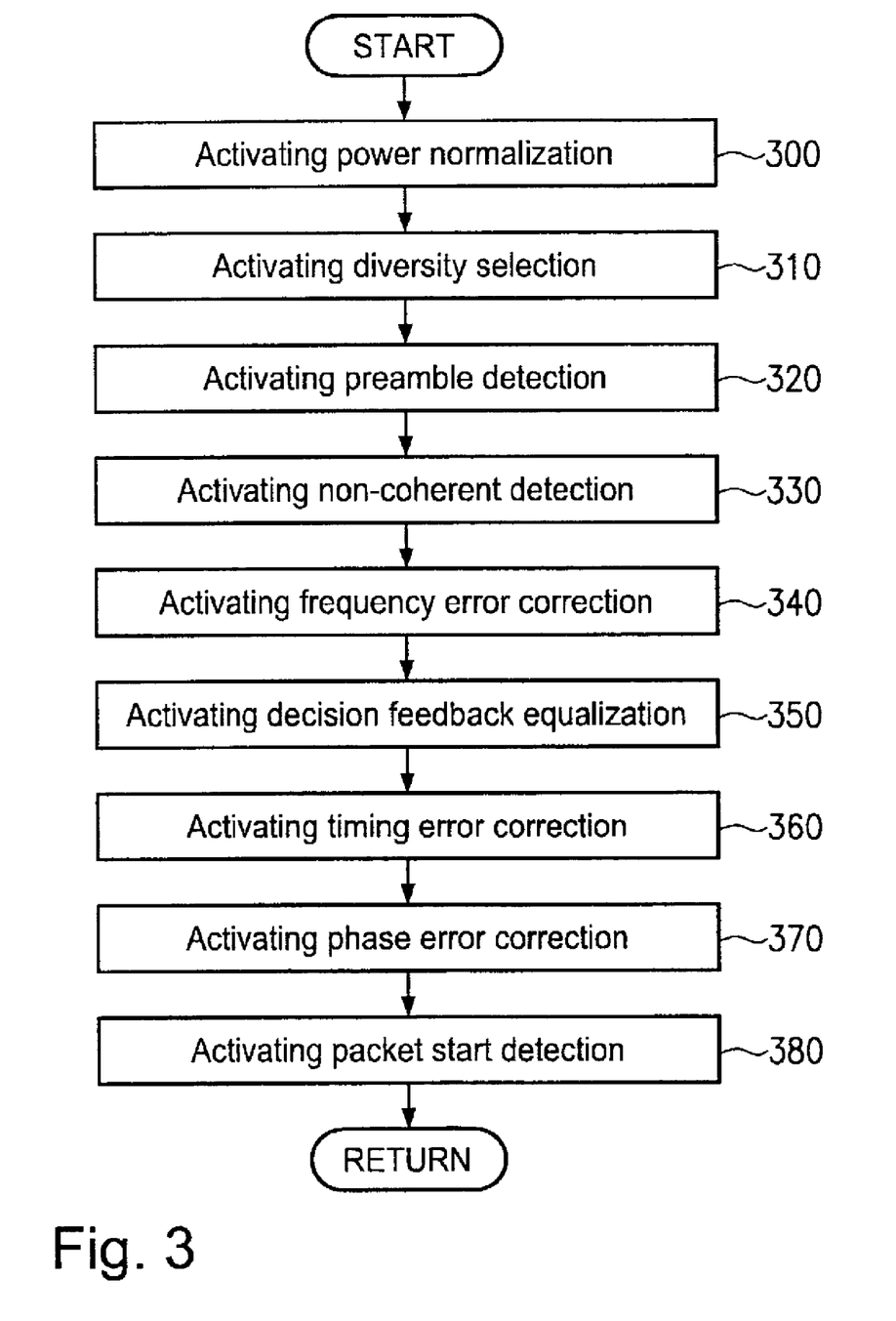
FIG. 3 is a flowchart illustrating the process of activating the components shown in FIG. 2.

The activation sequence in the present embodiment is depicted in FIG. 3. First, the power normalization unit 205 and the diversity selection unit 240 are activated in steps 300 and 310, respectively. As soon as signals from these units are available, the preamble detection unit 215 is activated (step 320). Next, the non-coherent detection unit 225 is made active in step 330 to prepare for the operation of the frequency error correction unit 220 and the decision feedback equalizer 245 (steps 340 and 350). In step 360, the timing error correction unit 210 is activated, and then, the phase error correction unit 235 is begun to be operated in step 370. The last unit in the baseband part 200 of the WLAN receiver of the present embodiment that is activated is the packet start detection unit 230 (step 380). Activation of phase error correction unit 235 and/or packet start detection unit 230 may also be in parallel to activation of timing error correction unit 210.

Figure 4:
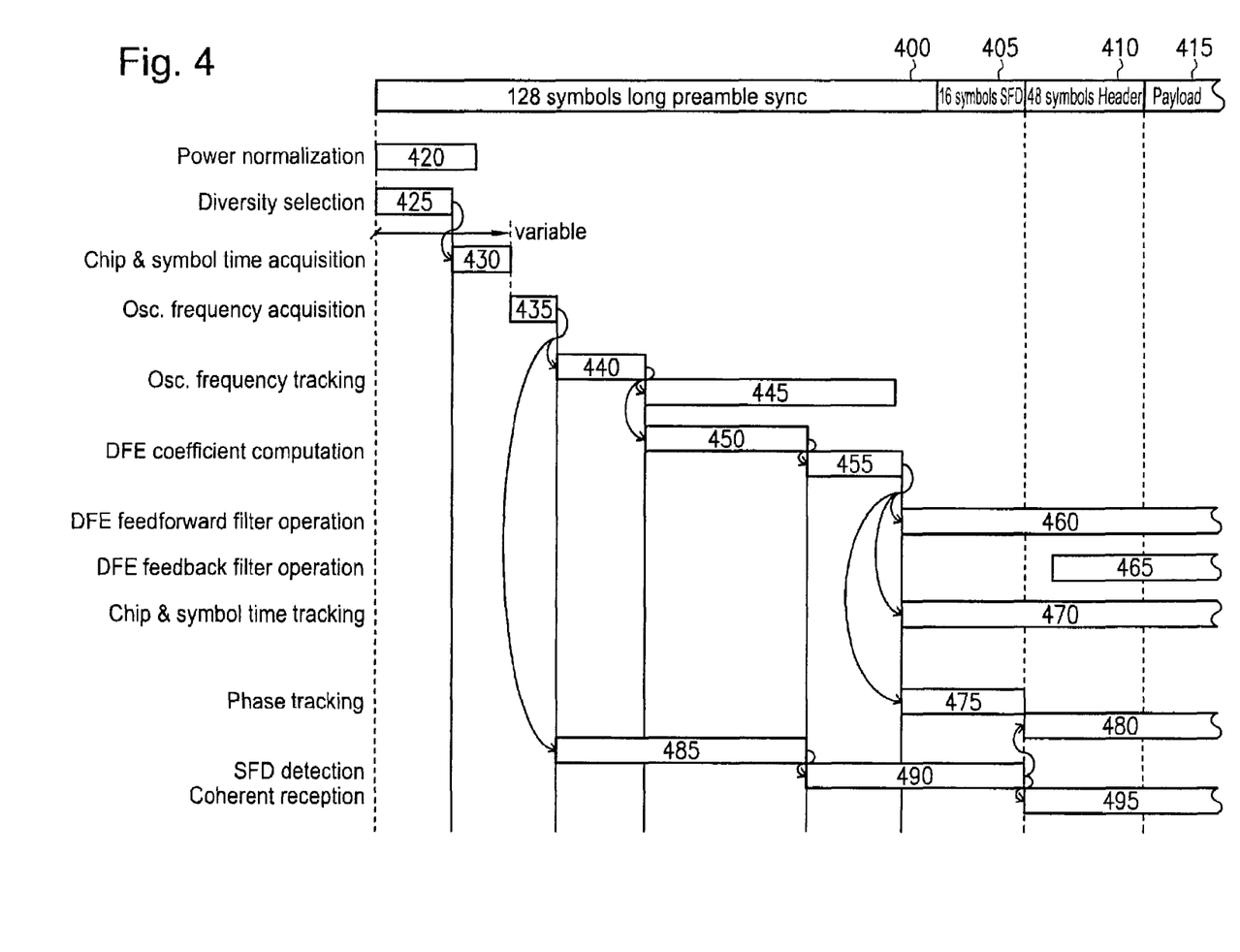
FIG. 4 is a timing chart of operating the WLAN receiver of FIG. 2 in a WLAN system that applies long preambles.

Turning now to FIG. 4 which is a timing chart illustrating in more detail the synchronization procedure of the receiver in the present embodiment, it can be seen that the received input signal comprises a preamble portion 400 which is in the present case a long preamble, a start of frame delimiter (SFD) portion 405 having 16 symbols, a header 410 having 48 symbols, and the payload 415. The synchronization procedure starts with performing the power normalization in time period 420 at the beginning of the preamble 400. Further, the diversity selection unit 240 performs diversity selection in time period 425.

Once the diversity selection is done, the synchronization acquisition is started. First, there is performed a chip and symbol time acquisition in time period 430 that is of variable length. During that time, the preamble detection unit 215 detects the presence of preamble 400, detects the chip sampling or symbol start index and detects that the preamble is a long preamble. At the threshold event driven end of time period 430, the non-coherent detection unit 225 is given a time period 435 to perform the oscillator frequency acquisition. After about 40 symbols from the beginning of the preamble 400, the first frequency estimate is available so that the tracking phase of the synchronization process can be initiated.

As can be seen from FIG. 4, the oscillator frequency tracking is performed first in the present embodiment. The frequency tracking may be done in two subperiods 440 and 445.

Additionally, at the end of the first subperiod 440, operation of the decision feedback equalization controller 255 may be triggered. The decision feedback equalization controller 255 may perform some channel estimation in time period 450 and then compute filter coefficients in period 455 to control the feedforward filter 250 and/or the feedback filter 260.

At the beginning of period 460 the filter coefficients are frozen, the initial timing offset is corrected, and the initial phase offset is sufficiently corrected as well. The feedforward filter 250 is then operated in time period 460, and the feedback filter 260 is activated to operate in time period 465. Further, the chip and symbol timing tracking is performed in period 470, and also the phase tracking is done simultaneously. As shown in the chart of FIG. 4, the phase tracking may be divided into two subperiods 475 and 480, and it is to be noted that also the chip and symbol time checking may be subdivided.

Finally, it can be seen from FIG. 4 that an SFD detection is performed in time period 490. This time period starts after expiration of time period 485 which is of fixed length, and it ends up with the SFD portion 405. At the end of time period 490, coherent reception is secured which will take place in period 495.

Figure 5:
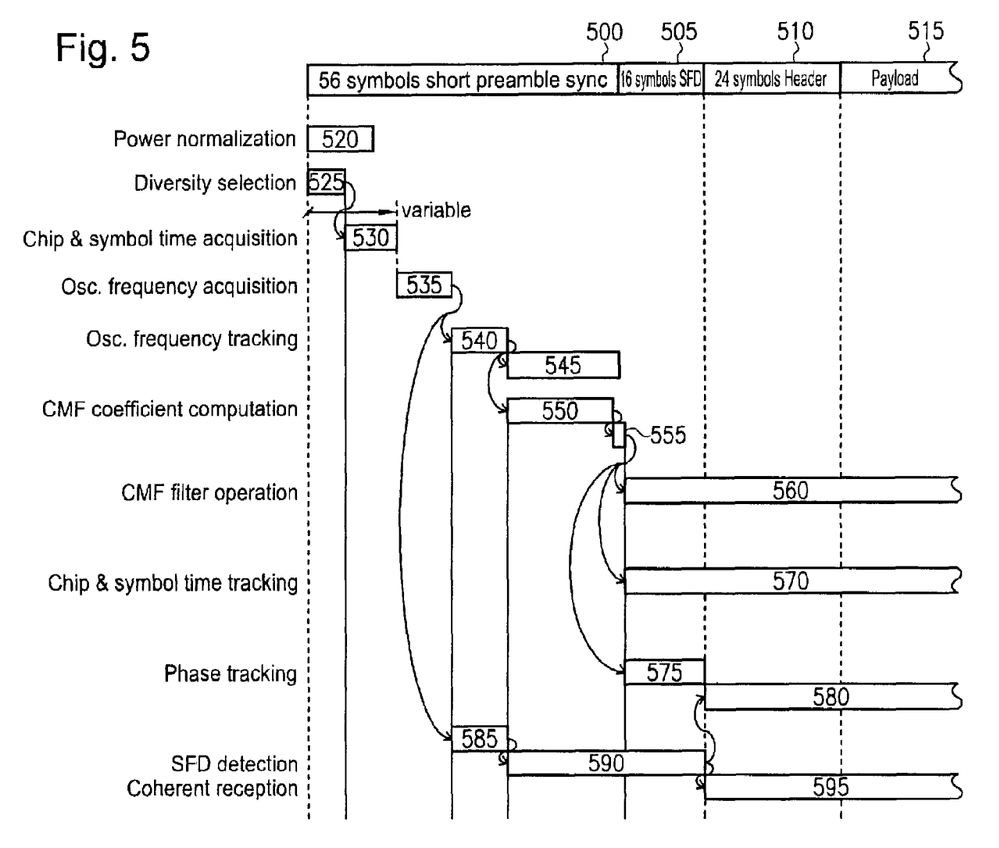
FIG. 5 is a timing chart that corresponds to that of FIG. 4 but applies to WLAN systems where short preambles are used.

Turning now to FIG. 5, a corresponding timing chart is shown in case of using short preambles 500. As can be seen from FIG. 5, most of the elements of the timing chart resemble the corresponding elements of FIG. 4 but may be shorter in time. Instead of using a decision feedback equalizer (DFE), a channel matched filter (CMF) may be used.

Figure 6:
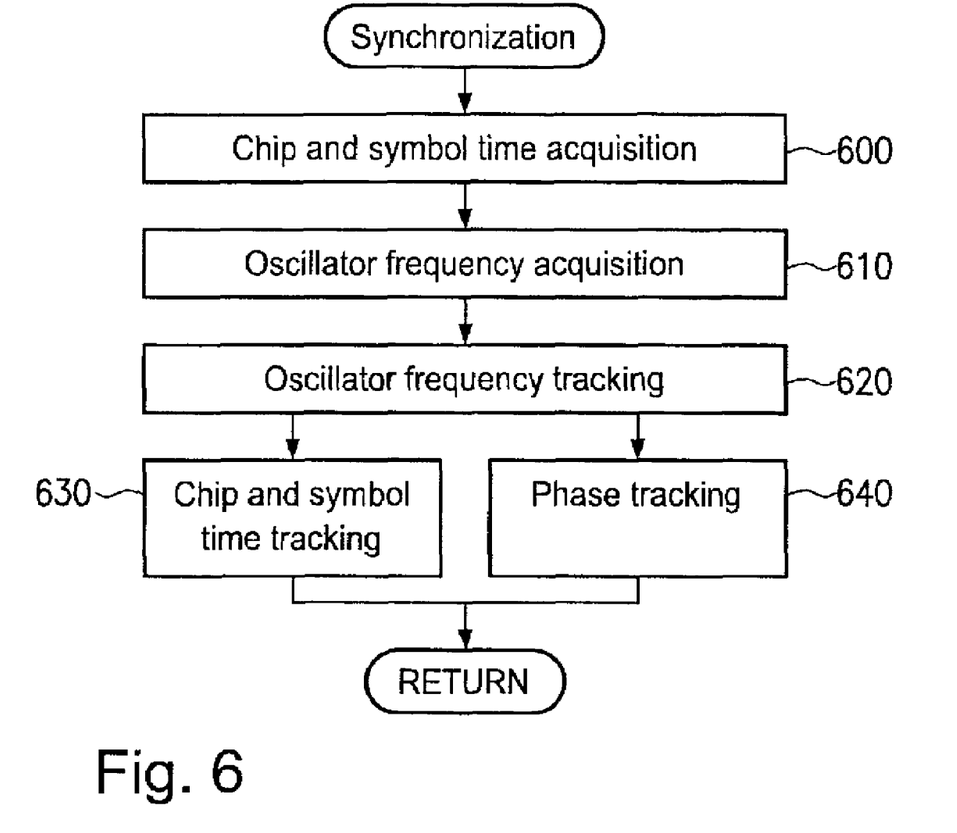
FIG. 6 is a flowchart illustrating a synchronization process according to an embodiment.

The sequence of the synchronization acquisition and tracking phases performed in the procedures of FIGS. 4 and 5 are illustrated in the flowchart of FIG. 6. First, a chip and symbol time acquisition is performed in step 600 (time period 430 or 530). Then, the oscillator frequency acquisition is done in step 610 that corresponds to time period 435 or 535. That is, the synchronization acquisition includes two separate processes that are performed sequentially. It is to be noted that more than two such acquisition processes may be performed in another embodiment.

Once acquisition is achieved, the tracking phase starts with step 620 of performing the oscillator frequency tracking in time periods 440, 445 or 540, 545. Then, chip and symbol time tracking and phase tracking are performed simultaneously in steps 630 and 640 (time periods 470-480 or 570-580). Again, it is to be noted that further tracking processes could be added simultaneously with steps 630 and 640. In addition, since there are also tracking processes 620 performed sequentially, further sequential processes could be added as well.

The embodiments described above may improve over conventional WLAN receivers in a number of aspects. First of all, the receivers according to the above embodiments includes a number of acquisition units 215, 225 that may be activated and deactivated sequentially. This avoids synchronization loops of higher order which could give rise to potential instabilities. Further, frequency and phase control are separately performed in units 220 and 235 and may therefore achieve much higher accuracy at the end of the phase control process. Moreover, those units 210, 250 that require higher sampling rates are arranged in the data path before those units 220, 235 that operate at reduced sampling rates, thus lowering the amount of hardware circuitry that is required. Another improvement may be that acquisition may use data-aided synchronization algorithms since it is done during the preamble portion 400, 500 of the received signal, while the time and phase tracking uses non data-aided synchronization algorithms which may be performed during the payload portions 415, 515 of the input signal. Moreover, the timing error correction unit 210 may be able to perform the time tracking even in case of a complete 50 ppm (parts per million) oscillator frequency offset, thus it may be insensitive or resistant with respect to an oscillator frequency offset.

As discussed above, the power normalization unit 205 is located in the data path directly behind the analog-to-digital converter of the radio-frequency part of the WLAN receiver so that the digital resolution, i.e. the width of the data words, in each other unit of the digital baseband part 200 may be reduced, thus leading to a significant simplification in the receiver design. Finally, there may be a timing and stability improvement due to the simple interface to the analog radio-frequency part of the receiver since the automatic gain control may entirely be performed in the analog radio-frequency part, thus avoiding a data feedback between the radio-frequency part and the baseband part 200 so that only a time insensitive stop signal is necessary to be fed back from the baseband part 200 to the radio-frequency part.

From the foregoing, it is apparent that a (timing and frequency) synchronization technique is provided that may be used in high rate, 802.11b compliant WLAN systems and that may further improve over conventional techniques with respect to mobile radio fading channel compensation.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A WLAN (Wireless Local Area Network) receiver comprising:
  at least two acquisition units configured to perform a synchronization acquisition process; and
  at least two tracking units configured to perform a synchronization tracking process, wherein said at least two tracking units include a first tracking unit configured to be operated at a first sampling rate and a second tracking unit configured to be operated at a second sampling rate, said first tracking unit being one of a frequency error correction unit, a decision feedback equalizer, a timing error correction unit, or a phase error correction unit, said second tracking unit being a different one of said frequency error correction unit, said decision feedback equalizer, said timing error correction unit, and said phase error correction unit, wherein said first sampling rate is greater than said second sampling rate;
  wherein said at least two acquisition units are arranged for being operated sequentially and said at least two tracking units are arranged for being operated simultaneously.

2. The WLAN receiver of claim 1, wherein said synchronization acquisition process includes chip and symbol time acquisition.

3. The WLAN receiver of claim 1, wherein said synchronization acquisition process includes frequency acquisition.

4. The WLAN receiver of claim 1, arranged for performing said synchronization acquisition process as long as the WLAN receiver receives the preamble of a data frame.

5. The WLAN receiver of claim 1, wherein said synchronization tracking process includes chip and symbol time tracking.

6. The WLAN receiver of claim 1, wherein said synchronization tracking process includes frequency tracking.

7. The WLAN receiver of claim 1, wherein said synchronization tracking process includes phase tracking.

8. The WLAN receiver of claim 1, arranged for performing said synchronization tracking process as long as the WLAN receiver receives the payload of a data frame.

9. The WLAN receiver of claim 1, wherein one of said at least two acquisition units is a preamble detection unit configured to detect a preamble in a received data stream.

10. The WLAN receiver of claim 9, wherein said preamble detection unit is connected to receive an output signal from a power normalization unit of said WLAN receiver.

11. The WLAN receiver of claim 9, wherein said preamble detection unit is connected to receive an output signal from a diversity selection unit of said WLAN receiver.

12. The WLAN receiver of claim 11, arranged for activating said preamble detection unit after having activated said diversity selection unit.

13. The WLAN receiver of claim 9, wherein said preamble detection unit is connected to receive an output signal from the feedforward filter of a decision feedback equalizer of said WLAN receiver.

14. The WLAN receiver of claim 9, wherein said preamble detection unit is connected to provide an output signal to a timing error correction unit of said WLAN receiver.

15. The WLAN receiver of claim 9, wherein said preamble detection unit is connected to provide an output signal to a frequency error correction unit of said WLAN receiver.

16. The WLAN receiver of claim 1, wherein one of said at least two acquisition units is a non-coherent detector configured to filter and demodulate a received signal and generating a frequency offset estimate.

17. The WLAN receiver of claim 16, wherein said non-coherent detector is connected to receive an output signal from a phase error correction unit of said WLAN receiver.

18. The WLAN receiver of claim 16, wherein said non-coherent detector is connected to provide an output signal to a frequency error correction unit of said WLAN receiver.

19. The WLAN receiver of claim 16, wherein said non-coherent detector is connected to provide an output signal to a decision feedback equalizer of said WLAN receiver.

20. The WLAN receiver of claim 16, wherein said non-coherent detector is connected to provide an output signal to a packet start detection unit of said WLAN receiver.

21. The WLAN receiver of claim 16, arranged for activating said non-coherent detector after having activated a preamble detection unit of said WLAN receiver.

22. The WLAN receiver of claim 1, wherein one of said at least two tracking units is a frequency error correction unit configured to detect and correct a frequency error.

23. The WLAN receiver of claim 22, wherein said frequency error correction unit is connected to receive an output signal from a preamble detection unit of said WLAN receiver.

24. The WLAN receiver of claim 22, wherein said frequency error correction unit is connected to receive an output signal from a non-coherent detector of said WLAN receiver.

25. The WLAN receiver of claim 24, arranged for activating said frequency error correction unit after having activated said non-coherent detector.

26. The WLAN receiver of claim 22, wherein said frequency error correction unit is connected to provide an output signal to a phase error correction unit of said WLAN receiver.

27. The WLAN receiver of claim 22, wherein said frequency error correction unit is connected to provide an output signal to a decision feedback equalizer of said WLAN receiver.

28. The WLAN receiver of claim 1, wherein one of said at least two tracking units is a decision feedback equalizer configured to generate a filtered output signal.

29. The WLAN receiver of claim 28, wherein said decision feedback equalizer is connected to receive an output signal from a timing error correction unit of said WLAN receiver.

30. The WLAN receiver of claim 28, wherein said decision feedback equalizer is connected to receive an output signal from a frequency error correction unit of said WLAN receiver.

31. The WLAN receiver of claim 30, arranged for activating said decision feedback equalizer after having activated said frequency error correction unit.

32. The WLAN receiver of claim 28, wherein said decision feedback equalizer is connected to receive an output signal from a phase error correction unit of said WLAN receiver.

33. The WLAN receiver of claim 28, wherein said decision feedback equalizer is connected to receive an output signal from a non-coherent detector of said WLAN receiver.

34. The WLAN receiver of claim 28, wherein said decision feedback equalizer is connected to provide an output signal to a preamble detection unit of said WLAN receiver.

35. The WLAN receiver of claim 1, wherein one of said at least two tracking units is a timing error correction unit configured to detect and correct a timing error.

36. The WLAN receiver of claim 35, wherein said timing error correction unit is connected to receive an output signal from a power normalization unit of said WLAN receiver.

37. The WLAN receiver of claim 35, wherein said timing error correction unit is connected to receive an output signal from a preamble detection unit of said WLAN receiver.

38. The WLAN receiver of claim 35, wherein said timing error correction unit is connected to provide an output signal to a decision feedback equalizer of said WLAN receiver.

39. The WLAN receiver of claim 38, arranged for activating said timing error correction unit after having activated said decision feedback equalizer.

40. The WLAN receiver of claim 35, wherein said timing error correction unit is arranged for being insensitive to a frequency offset of a signal generated by an oscillator of the WLAN receiver.

41. The WLAN receiver of claim 1, wherein one of said at least two tracking units is a phase error correction unit configured to detect and correct a phase error.

42. The WLAN receiver of claim 41, wherein said phase error correction unit is connected to receive an output signal from a frequency error correction unit of said WLAN receiver.

43. The WLAN receiver of claim 41, wherein said phase error correction unit is connected to provide an output signal to a decision feedback equalizer of said WLAN receiver.

44. The WLAN receiver of claim 41, wherein said phase error correction unit is connected to provide an output signal to a non-coherent detector of said WLAN receiver.

45. The WLAN receiver of claim 41, arranged for activating said phase error correction unit after having activated a decision feedback equalizer of said WLAN receiver.

46. The WLAN receiver of claim 1, further comprising:
   a frequency error correction unit configured to detect and correct a frequency error; and
   a phase error correction unit for detecting and correcting configured to detect and correct a phase error,
   wherein one of said frequency and phase error correction units is one of said at least two tracking units,
   said frequency error correction unit forms a first stage of said WLAN receiver, and
   said phase error correction unit forms a second stage of said WLAN receiver.

47. The WLAN receiver of claim 46, wherein said first stage is arranged for being operated before operation of said second stage.

48. The WLAN receiver of claim 1, wherein:
said synchronization acquisition process includes performing a data-aided synchronization algorithm, and
said synchronization tracking process includes performing a non data-aided synchronization algorithm.

49. The WLAN receiver of claim 1, wherein said first tracking unit is located in the data path of said WLAN receiver before said second tracking unit.

50. The WLAN receiver of claim 1, wherein said first tracking unit is a timing error correction unit configured to detect and correct a timing error.

51. The WLAN receiver of claim 1, wherein said first tracking unit is the feedforward filter of a decision feedback equalizer.

52. The WLAN receiver of claim 1, wherein said second tracking unit is a frequency error correction unit for detecting and correcting a frequency error.

53. The WLAN receiver of claim 1, wherein said second tracking unit is a phase error correction unit configured to detect and correct a phase error.

54. The WLAN receiver of claim 1, further comprising:
a power normalization unit configured to normalize the power of a received input signal,
wherein said power normalization unit is connected to receive a digitized representation of said received input signal from an analog-to-digital converter of said WLAN receiver.

55. The WLAN receiver of claim 1, comprising:
a radio-frequency part; and
a baseband part connected to said radio-frequency part, wherein said acquisition and tracking units are arranged within said baseband part.

56. The WLAN receiver of claim 55, wherein said radio-frequency part is made of analog circuitry and said baseband part is made of digital circuitry.

57. The WLAN receiver of claim 55, wherein said radio-frequency part comprises:
an automatic gain control unit configured to automatically control an amplification gain when amplifying a received signal.

58. The WLAN receiver of claim 1, being IEEE 802.11b compliant.

59. A method of operating a WLAN (Wireless Local Area Network) receiver, the method comprising:
performing a synchronization acquisition; and
performing a synchronization tracking;
wherein said synchronization acquisition includes performing at least two acquisition processes sequentially, and
wherein said synchronization tracking includes performing at least two tracking processes simultaneously, wherein performing said two tracking processes simultaneously includes performing a first tracking process at a first sampling rate and performing a second tracking process at a second sampling rate, wherein the first sampling rate is greater than the second sampling rate;
wherein said first tracking process is one of a frequency error correction process, a decision feedback equalization process, a timing error correction process, or a phase error correction process, and wherein said second tracking process is a different one of said frequency error correction process, said decision feedback equalization process, said timing error correction process, or said phase error correction process.

60. The method of claim 59, wherein one of said at least two acquisition processes is a chip and symbol time acquisition process.

61. The method of claim 59, wherein one of said at least two acquisition processes is a frequency acquisition process.

62. The method of claim 59, wherein one of said at least two tracking processes is a chip and symbol time tracking process.

63. The method of claim 62, wherein said chip and symbol time tracking process is insensitive to a frequency offset of a signal generated by an oscillator of the WLAN receiver.

64. The method of claim 59, wherein one of said at least two tracking processes is a phase tracking process.

65. The method of claim 64, wherein said phase tracking process is performed after having performed a frequency tracking process.

66. The method of claim 59, wherein said synchronization acquisition is performed as long as the WLAN receiver receives the preamble of a data frame.

67. The method of claim 59, wherein said synchronization tracking is performed as long as the WLAN receiver receives the payload of a data frame.

68. The method of claim 59, wherein said synchronization tracking includes a frequency tracking process.

69. The method of claim 59, wherein said step of performing a synchronization acquisition comprises:
activating a preamble detection unit of said WLAN receiver.

70. The method of claim 69, wherein said step of activating said preamble detection unit is performed after activating a diversity selection unit of said WLAN receiver.

71. The method of claim 69, wherein said step of activating said preamble detection unit is performed after activating a power normalization unit of said WLAN receiver.

72. The method of claim 59, wherein said step of performing a synchronization acquisition comprises:
activating a non-coherent detector of said WLAN receiver.

73. The method of claim 72, wherein said step of activating said non-coherent detector is performed after activating a preamble detection unit of said WLAN receiver.

74. The method of claim 59, wherein said step of performing a synchronization tracking comprises:
activating a frequency error correction unit of said WLAN receiver.

75. The method of claim 74, wherein said step of activating said frequency error correction unit is performed after activating a non-coherent detector of said WLAN receiver.

76. The method of claim 59, wherein said step of performing a synchronization tracking comprises:
activating a decision feedback equalizer of said WLAN receiver.

77. The method of claim 76, wherein said step of activating said decision feedback equalizer is performed after activating a frequency error correction unit of said WLAN receiver.

78. The method of claim 59, wherein said step of performing a synchronization tracking comprises:
activating a timing error correction unit of said WLAN receiver.

79. The method of claim 78, wherein said step of activating said timing error correction unit is performed after activating a decision feedback equalizer of said WLAN receiver.

80. The method of claim 59, wherein said step of performing a synchronization tracking comprises:
activating a phase error correction unit of said WLAN receiver.

81. The method of claim 80, wherein said step of activating said phase error correction unit is performed together with activating a timing error correction unit of said WLAN receiver.

82. The method of claim 80, wherein said step of activating said phase error correction unit is performed after activating a frequency error correction unit of said WLAN receiver.

83. The method of claim 59, wherein:
said synchronization acquisition includes performing a data-aided synchronization algorithm, and
said synchronization tracking includes performing a non data-aided synchronization algorithm.

84. The method of claim 59, further comprising:
activating a digital power normalization unit of said WLAN receiver for normalizing the power of a received input signal.

85. The method of claim 59, wherein said synchronization acquisition and tracking are performed by a digital baseband part of said WLAN receiver.

86. The method of claim 59, wherein said WLAN receiver is IEEE 802.11b compliant.

* * * * *

UNITED STATES PATENT AND TRADEMARK OFFICE
CERTIFICATE OF CORRECTION

| | |
|---|---|
| PATENT NO. | : 7,327,717 B2 |
| APPLICATION NO. | : 10/185354 |
| DATED | : February 5, 2008 |
| INVENTOR(S) | : Jörg Borowski et al. |

Page 1 of 1

It is certified that error appears in the above-identified patent and that said Letters Patent is hereby corrected as shown below:

Claim 46, col. 8, line 57, please change "a phase error correction unit for detecting and correcting" to --a phase error correction unit--.

Signed and Sealed this

Twentieth Day of May, 2008

JON W. DUDAS
*Director of the United States Patent and Trademark Office*